Figure 1:
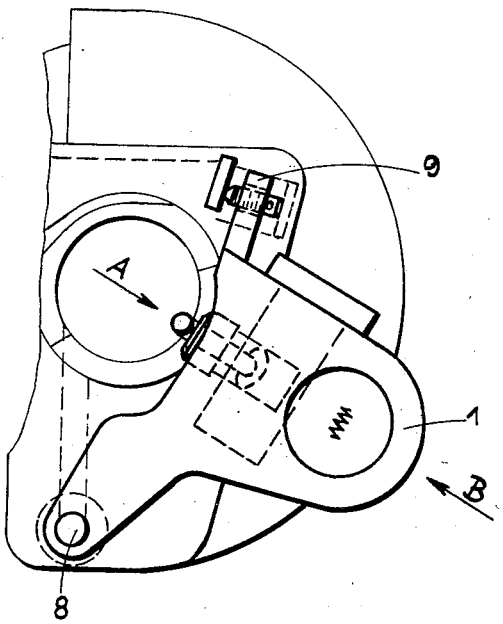

Oct. 9, 1956     H. KRONENBERGER     2,766,329
OPTICAL SCANNING DEVICE FOR SOUND FILM APPARATUS
Filed May 9, 1952     2 Sheets-Sheet 1

A-B

Inventor.
Heinz Kronenberger.
By

Oct. 9, 1956 H. KRONENBERGER 2,766,329
OPTICAL SCANNING DEVICE FOR SOUND FILM APPARATUS
Filed May 9, 1952 2 Sheets-Sheet 2
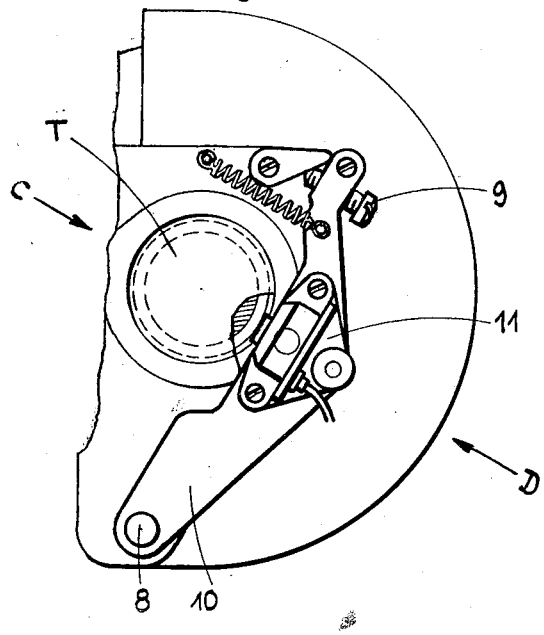
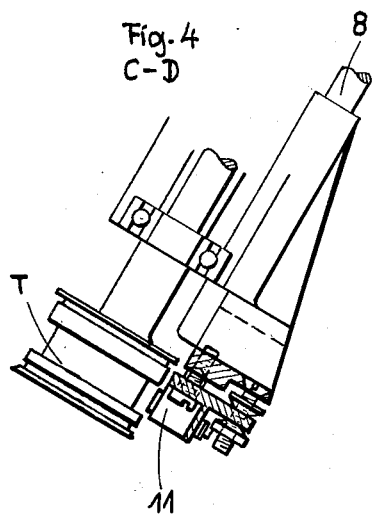
Inventor.
Heinz Kronenberger.
By
Atty.

United States Patent Office 2,766,329
Patented Oct. 9, 1956

2,766,329

OPTICAL SCANNING DEVICE FOR SOUND FILM APPARATUS

Heinz Kronenberger, Karlsruhe, Germany, assignor to Siemens & Halske Aktiengesellschaft, Munich, Germany, a German corporation Application May 9, 1952, Serial No. 286,881

Claims priority, application Germany June 29, 1951

2 Claims. (Cl. 179—100.3)

This invention is concerned with a scanning or pickup device for optical or magnetic sound film apparatus.

The scanning system for known optical sound film apparatus comprises a light source, optical illuminating and scanning means, and in some cases a light-control rod and photocell means. In the case of forward scanning, the optical illuminating means may be combined to form with the scanning means a structural unit.

All of the previously known structures and arrangements provide for separate securing and mounting means for the individual units, and all require, in addition to the adjustments for the optical system, further adjustments of the structural units and their mutual cooperation. These adjustments require a great deal, so far as production tolerances and labor are concerned. These systems require inherently a great many individual parts which are costly in production, due to the narrow limits of the required tolerances. The necessity for adjusting individual groups of component parts has the disadvantage proved in practice, that it does not always bring the best results. A further disadvantage resides in the fact that parts that had been machined in accordance with required tolerances frequently must be worked again incident to the final assembly so as to correct discrepancies. It may be mentioned in this connection that such structural parts are in the final assembly frequently mounted in jigs, and corrections that must be made therefore require a great deal of time and effort, due to the difficult procedure of removal of the parts from the jigs.

Special requirements are put on the structure of the optical system, depending on its particular nature, because for sharp focusing it must be arranged adjustably in the direction of the optical axis while maintaining the gap position. This requirement can be satisfied either by using a costly optical structure (a micro-objective may be adjustably provided therein), or by using a simple structure but providing a very involved adjusting mechanism for the mounting, which calls for rigidly maintained tolerances. The cost advantage gained in the optical part is thus partially lost.

The invention proposes to overcome the above indicated drawbacks and difficulties by arranging upon a common holder, which is adjustable with respect to the film guide roller, all scanning elements of the optical sound film apparatus, including the light source, illumination and optical scanning means, as well as the photocell and, if required, also the light-control rod. The arrangement is particularly adapted for apparatus operating with narrow films. The common holder is, in accordance with the invention pivotally disposed on a shaft or pin in such a manner as to permit adjustment of the spacing between the gap and the optical system.

Another object is concerned with arranging the magnetic scanning means, and especially the magnetic pickup head in a magnetic recorder or the like in corresponding manner adjustably on a holder.

The holder for the optical scanning means and the holder for the magnetic scanning means are so constructed that they may be interchangeably used in a recording apparatus or the like.

Figure 2:
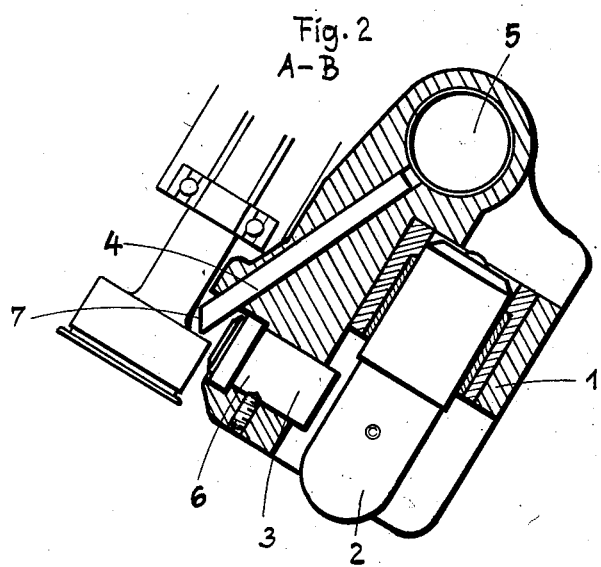

Examples of the invention are diagrammatically indicated in the accompanying drawings, wherein Fig. 1 is an elevational view of a device for optical scanning;

Fig. 2 shows the device in section taken approximately along line A—B of Fig. 1; and Figs. 3 and 4 are similar views of a device for magnetic scanning, Fig. 3 showing the device in elevation and Fig. 4 in section taken along line C—D of Fig. 3.

The device shown in Figs. 1 and 2 comprises an accurately machined die-cast frame 1 carrying all structural units, namely, the light source 2, the optical system 3, the glass rod 4 and the photocell 5. These parts are properly adjusted relative to one another. The fixedly disposed optical system 3 is provided with an indentation 6 for adjusting it in the proper gap position. Additional adjusting means are thereby made unnecessary. The glass rod 4 is provided with an oblique surface 7. The round structure requires for its mounting merely a circular bore. The advantage as compared with a square structure is that jamming due to manufacturing inequalities is prevented. The round glass rod and the circular bore are of course also easier to make. The glass rod is so disposed relative to the optical means 3 that it operates as a light-collecting cylinder lens in parallel with the gap.

The holder 1 is journalled for pivotal motion about the pivot 8. An adjusting screw 9 is provided for the fine adjustment of the holder 1 relative to the film guide roller T in the direction G/H.

The simple structural elements are also employed for carrying out adjustments. The gap position relative to the film is determined by shifting the holder 1 along its pivot 8. A screw may be provided for locking the holder in its adjusted position on the pivot 8. There are no machined surfaces requiring close tolerances outside of the bore for receiving the pivot 8.

The entire holder 1 with its structural parts may be used as a unit in several types of recording apparatus.

The embodiment shown in Figs. 3 and 4 is for magnetic scanning and is also particularly adapted for apparatus operating with narrow films. It may be used in place of the device shown in Figs. 1 and 2. There is a holder 10 carrying the magnetic head 11. This holder is in similar manner as in Figs. 1 and 2 journalled on the pivot 8 and is axially adjustable thereon. Any suitable and desired means may be provided for fixing the holder in any adjustable position on the pivot member 8. For example, a screw may be provided for securing the holder in any position of adjustment. The adjustment by means of the screw 9 is analogous to that described in connection with Figs. 1 and 2. It will be observed that the embodiment shown in Figs. 3 and 4 also provides a spring which biases the holder in normal position against an adjustable stop. Such spring and adjustable stop may also be provided in the structure shown in Figs. 1 and 2. The adjustable stop enlarges the adjustment range and permits adjustment of the holder in a predetermined normal position independent of the adjusting screw 9.

An antidistortion device for direct connection of the scanning device to a wireless receiver or the like may, in accordance with the invention, be mounted on the holder of either embodiment.

Changes may be made within the scope and spirit of the appended claims.

I claim:

1. In a sound film apparatus having a rotatable guide roller for moving a film carrying a sound track relative to a point where said sound track is scanned, a unitary subassembly which is as a unit mountable in said sound film apparatus and as a unit removable therefrom, said subassembly forming a device for scanning said sound track and comprising a holder carrying scanning elements mounted thereon, said scanning elements including a light source and an optical system and a lens rod coacting with said optical system and a photoelectric cell coacting with said lens rod, mounting means in said apparatus for pivotally mounting said holder, means for adjusting the position of said holder axially of said mounting means to adjust the position of said scanning elements laterally of said sound track, and means for adjusting the angular position of said holder on said mounting means to adjust the position of said scanning elements perpendicularly of said sound track.

2. The structure as set forth in claim 1, wherein said lens rod is a circular rod disposed in a circular bore formed in said holder.

References Cited in the file of this patent

UNITED STATES PATENTS

| | | |
|---|---|---|
| 2,496,959 | Rodgers | Feb. 7, 1950 |
| 2,585,913 | Camras | Feb. 19, 1952 |
| 2,605,364 | Masterson | July 29, 1952 |
| 2,640,886 | Davis | July 2, 1953 |
| 2,644,856 | Pettus | July 7, 1953 |
| 2,654,809 | Camras | Oct. 6, 1953 |
| 2,658,951 | Albee | Nov. 10, 1953 |